(12) United States Patent
Imai

(10) Patent No.: US 6,581,225 B1
(45) Date of Patent: Jun. 24, 2003

(54) MATTRESS USED FOR PREVENTING BEDSORES OR THE LIKE

(76) Inventor: Kazumichi Imai, 7-29-1222, 1-chome, Nankouhigashi, Sumince-ku, Osaka (JP)

( * ) Notice: Subject to any disclaimer, the term of this patent is extended or adjusted under 35 U.S.C. 154(b) by 33 days.

(21) Appl. No.: 09/604,350

(22) Filed: Jun. 27, 2000

(30) Foreign Application Priority Data

Jul. 2, 1999 (JP) .......................................... 11-189639

(51) Int. Cl.⁷ .............................................. A47C 21/04
(52) U.S. Cl. ................................. 5/423; 5/421; 5/652.2
(58) Field of Search ......................... 5/423, 726, 652.1, 5/421, 652.2, 713; 297/180.1, 180.13, 180.16, 180.14

(56) References Cited

U.S. PATENT DOCUMENTS

| | | |
|---|---|---|
| 5,001,793 A | 3/1991 | Lui |
| 5,004,294 A | 4/1991 | Lin |
| 5,590,428 A | 1/1997 | Roter |

FOREIGN PATENT DOCUMENTS

| | | |
|---|---|---|
| EP | 0689786 | 1/1996 |
| JP | 60-75014 | 4/1985 |
| JP | 62-33828 | 2/1987 |
| JP | 2-47956 | 4/1990 |
| JP | 8-28797 | 2/1996 |
| JP | 009166 | 1/2000 |
| WO | 9324088 | 12/1993 |
| WO | 9747220 | 12/1997 |

*Primary Examiner*—Teri Pham Luu
*Assistant Examiner*—Fredrick Conley

(57) ABSTRACT

The present invention provides an air supply mattress control system for the release of air at a controlled pressure and temperature to a user. A mattress or support member is supplied with pressurized air and has a plurality of force activated nozzle valve assemblies positioned across the upper surface of the mattress. When the upper surface of the valves are forced downward, the valves can release air from a manifold within the mattress. The air can be conditioned and pressurized by a pump and an air conditioning unit. Operation controls can be conveniently positioned adjacent a bed frame for setting the operation conditions of the air mattress.

6 Claims, 10 Drawing Sheets

MATTRESS USED FOR PREVENTING BEDSORES OR THE LIKE

BACKGROUND OF THE INVENTION

1. Field of the Invention

The present invention relates to a mattress employing a jet of air to be used for preventing bedsores and a mattress control system.

2. Description of the Prior Art

It would often happen that user of a mattress would suffer from bedsores when continuously lying on a bed utilizing a conventional mattress for a long time. Bedsores are mainly caused through friction between a user's skin and the bed sheet or through humidity.

Particularly humidity makes the skin of the user be sodden such that bacteria are apt to adhere to the sudden skin, and while it is considered that eliminating humidity is effective in preventing bedsores, it was actually impossible to effectively eliminate humidity from conventional mattresses.

The present invention has been made in view of the above circumstances, and it is an object thereof to provide a mattress used for preventing bedsores or the like with which it is possible to effectively eliminate humidity.

SUMMARY OF THE INVENTION

For achieving this object, the mattress used for preventing bedsores or the like according to the present invention is a mattress with a plurality of nozzle portions comprising valves being formed on an upper surface of the mattress, wherein the valves are opened only when pressure is applied on the nozzle portions from above for upwardly discharging air transmitted from an air supply device.

It is also possible to arrange the mattress used for preventing bedsores or the like according to the present invention with a plurality of nozzle portions comprising valves being formed on an upper surface of the mattress, wherein the valves are opened only when pressure is applied on the nozzle portions from above for upwardly discharging air transmitted from an air supply device, wherein each nozzle portion is comprised of a nozzle main body and a vertically moving body, the nozzle main body being of substantially a cylindrical shape including a valve seat in an interior thereof, and the vertically moving body being comprised of a valve body provided below the valve seat, a suspending body piercing through the valve seat and supporting the valve body from above, a peak portion for fixing an upper end of the suspending body to a lower surface thereof and including a plurality of pores, and a tubular body connected downward of the peak portion along a periphery thereof and guided by the nozzle main body.

It is alternatively possible to connect the air supply device and lower ends of the nozzle portions through tubes to enable a specification of nozzle portions to which air is to be supplied from the air supply device and nozzle portions to which air is not to be supplied, and to control timings for supplying air and temperatures of air to be supplied in accordance with positions for mounting the nozzle portions.

The mattress may also be an air mattress and the temperature of air to be supplied to the nozzle portions may be adjustable.

With the above arrangements, it is possible to provide a mattress used for preventing bedsores or the like with which it is possible to effectively eliminate humidity.

When using a modification of the mattresses as seats for vehicles such as automobiles, airplanes or trains, it is possible to eliminate stress (stuffiness, etc.) caused by continuously setting on seats, and users may spend the time during traveling in a convenient manner.

DETAILED DESCRIPTION OF THE PREFERRED EMBODIMENTS

Embodiments in accordance with the present invention will now be explained with reference to the drawings.

Figure 1:
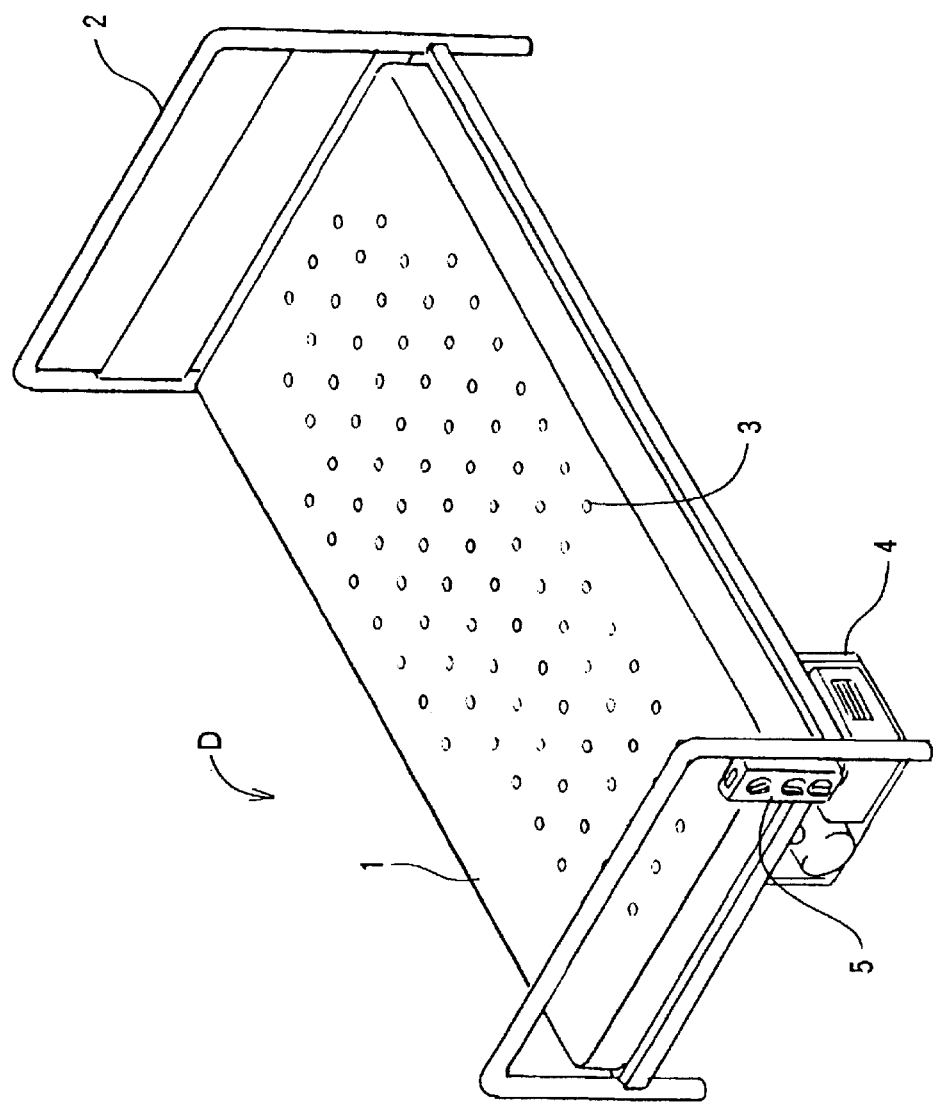
FIG. 1 is a perspective view schematically showing an arrangement of the bedsore-preventing mattress according to a first embodiment of the present invention.
Figure 2:
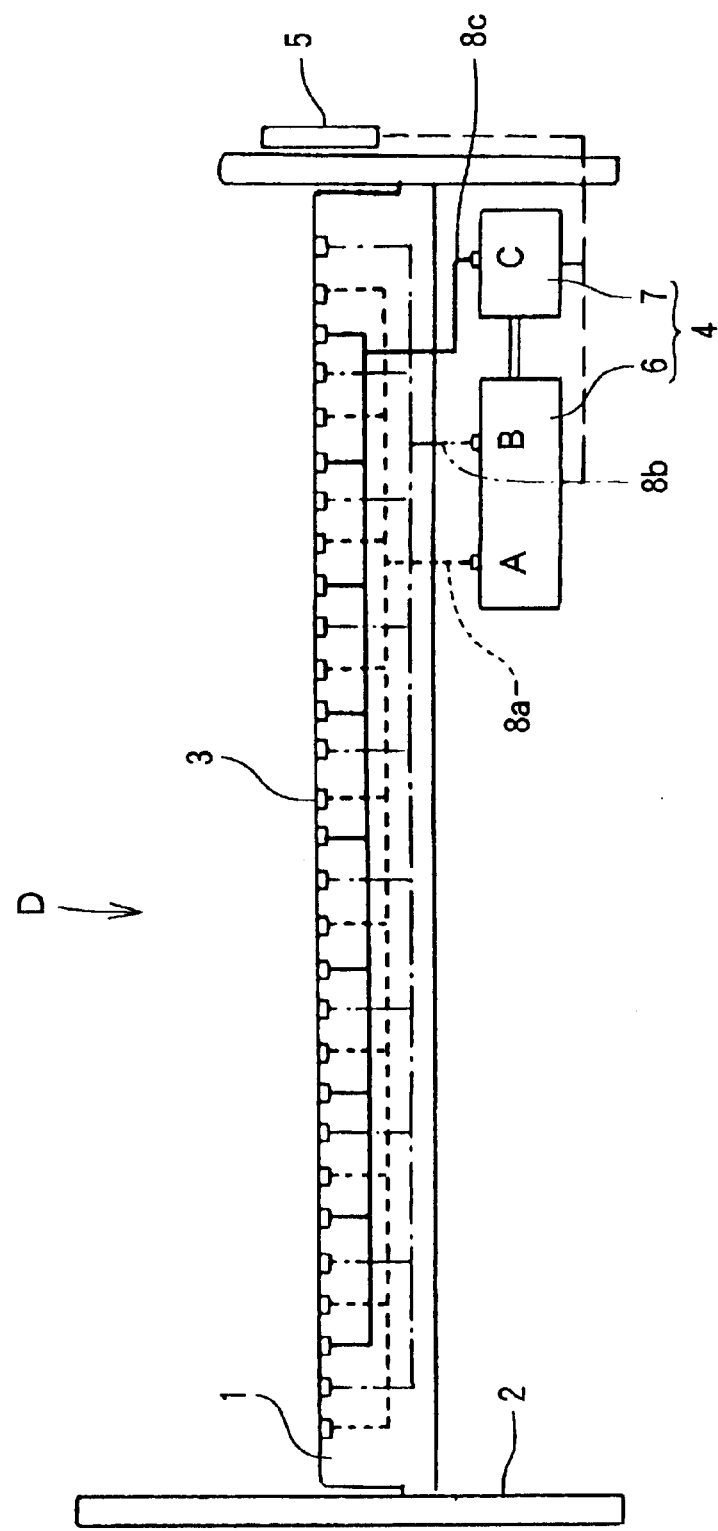
FIG. 2 is a circuit view schematically showing an arrangement according to the above embodiment.

FIGS. 1 and 2 are a perspective view and a circuit view schematically showing an arrangement of the bedsore-preventing mattress D according to a first embodiment of the present invention.

A mattress 1 placed on a bed 2 is provided with a plurality of nozzle portions 3, 3 . . . on an upper surface thereof. 4 denotes a pump serving as an air supply device for transmitting air X to the nozzles 3, 3 . . . , and a operational unit 5 for operating the pump 4 is provided on a lateral side on a rear side of the bed 2. Note that the pump 4 may be arbitrarily located when the pump does not oscillate or generate noise at the time of actuation and causes no danger when being approached or touched; otherwise, it is preferable to keep the pump away from a person using the bed 2 as far as possible.

The pump 4 is comprised of an air pump portion 6 and an air conditioning portion 7 connected to the air pump portion 6, wherein the air pump portion 6 includes discharge outlets A, B and the air conditioning portion 7 includes a discharge outlet C. Air X discharged through the discharge outlets A and B is directly discharged from the air pump portion 6, while air X discharged through the discharge outlet C is firstly transmitted from the air pump portion 6 to the air conditioning portion 7 to be adjusted in temperature in the air conditioning portion 7 before discharge. With this arrangement, operations for supplying and terminating air X from the discharge outlets A, B and C to the nozzle portions 3, 3 . . . can be performed by independently opening and closing the discharge outlets A, B and C so that it is possible to specify nozzle portions 3, 3 . . . to which air is to be supplied and nozzle portions 3, 3 . . . to which air is not to be supplied.

Note that the arrangement of the pump 4 is not limited to the above-described one, but may alternatively be arranged in that air X discharged through the discharge outlets A and B is once passed through the air conditioning portion 7 for temperature adjustment and returned to the air pump portion 6 to be discharged therefrom, or in that the air pump portion 6 and the air conditioning portion 7 are integrally formed, wherein temperatures, discharge speeds and discharge timings of air X to be discharged through the respective discharge outlets are independently controlled. It is further possible to employ an arrangement in which the discharge outlets A, B and C are closed or a power source for the pump 4 is switched OFF for terminating supply of air X upon detection of a specified pressure to thereby prevent inconveniences owing to excess supply of air X from the pump 4. The number of discharge outlets A, B and C is not limited to three, and may be suitably varied depending on particular use.

8a, 8b and 8c denote tubes or manifolds that are respectively connected to the discharge outlets A, B and C of the pump 4 at upstream sides thereof. Downstream sides of the respective tubes 8a, 8b and 8c are multiply branched and downstream sides of the branched tubes are connected to the nozzle portions 3 provided on the upper surface of the mattress 1.

Figure 3:
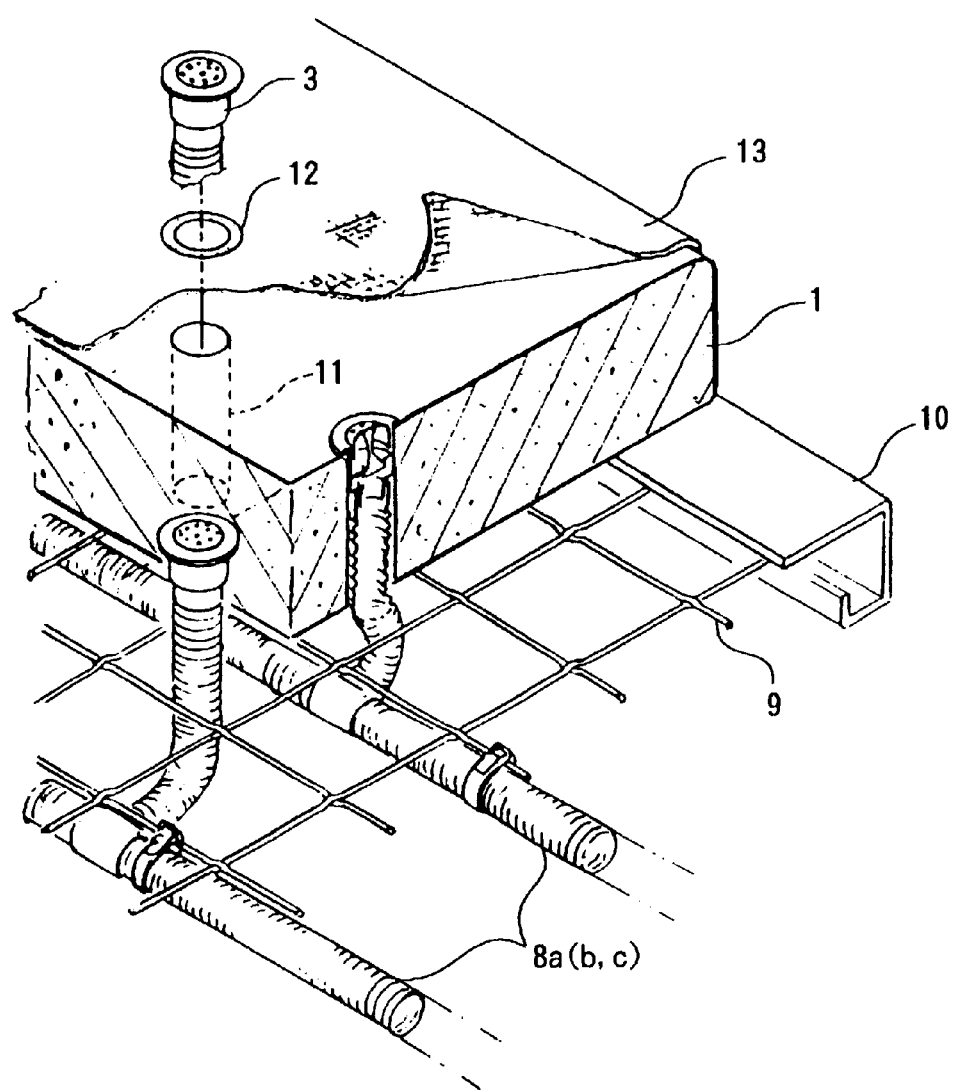
FIG. 3 is a partially enlarged perspective view schematically showing an arrangement according to the above embodiment.

FIG. 3 is a partial enlarged perspective view schematically showing the arrangement of the above embodiment.

9 denotes a net portion held by an outer frame 10 of the bed 2, and the mattress 1 is placed on the upper side of the net portion 9 and the outer frame 10. The mattress 1 is provided with a plurality of through holes 11, wherein the branched tubes 8a, 8b and 8c are inserted into these through holes 11 for connection with the nozzle portions 3. It should be noted that 12 denotes a washer and 13 a sheet with breezing properties that is spread over the mattress 1.

Figure 4:
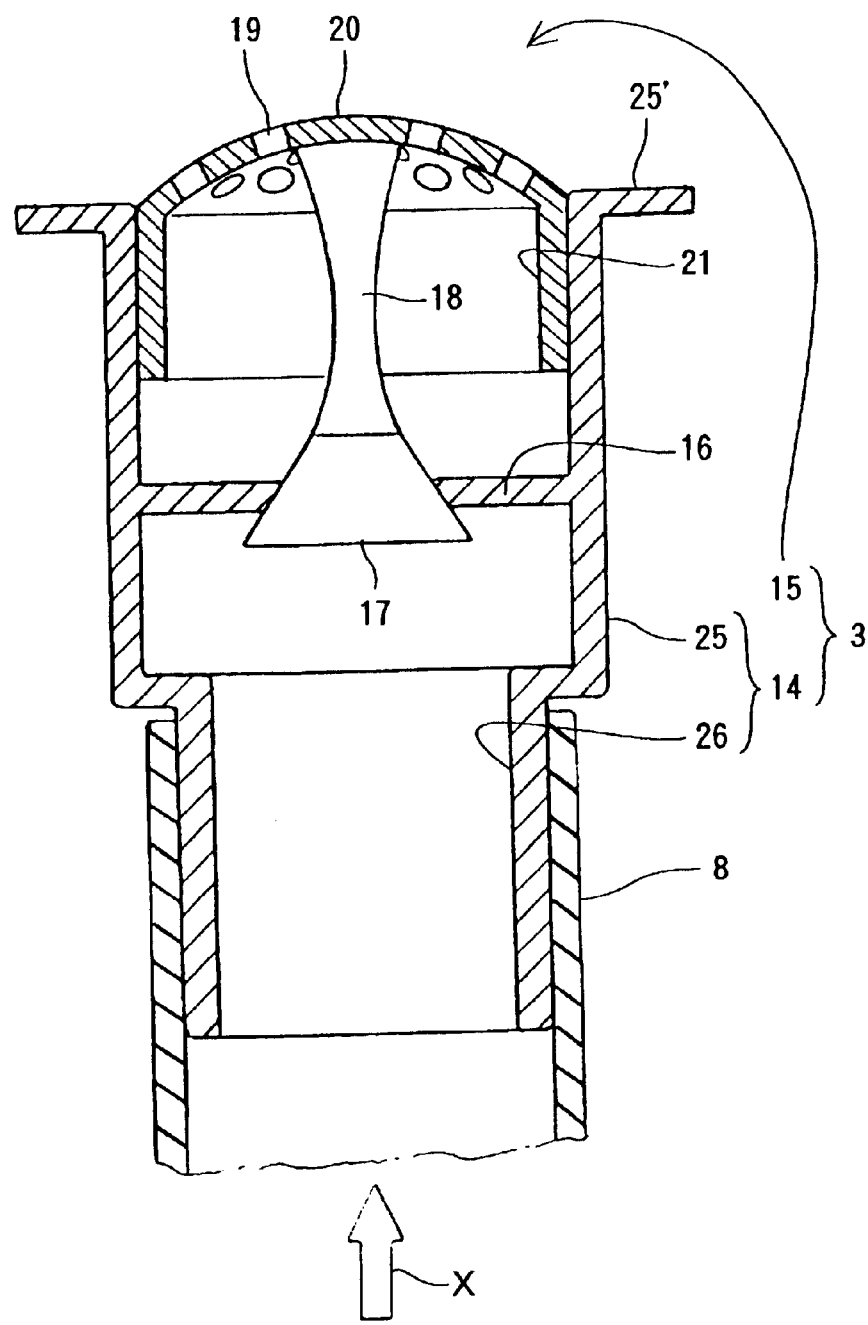
FIG. 4 is a longitudinal sectional view schematically showing an arrangement of a main portion according to the above embodiment.

FIG. 4 is a longitudinal sectional view schematically showing the arrangement of the nozzle portions 3 of the above embodiment.

Each nozzle portion 3 is comprised of a nozzle main body 14 and a vertically moving body 15, wherein the nozzle main body 14 is comprised of a substantially tubular large diameter portion 25 and a small diameter portion 26, with a valve seat 16 being provided in an interior of the large diameter portion 25. On the other hand, the vertically moving body 15 is comprised of a valve body 17 provided below the valve seat 16 of the nozzle main body 14, a suspending body 18, extending through a center of the valve seat 16 and supporting the valve body 17 from above, a peak portion or nozzle head 20 for fixing an upper end of the suspending and body 18 to a lower surface thereof and including a plurality of pores 19, 19 . . . , and a hollow cylendrical tubular body 21 connected downward of the peak portion 20 along a periphery thereof and guided along an inner side of an upper side of the large diameter portion 25 of the nozzle main body 14.

The valve body 17 is configured to assume a tapered surface with an external surface becoming wider in approaching its lower side, and an external appearance of the peak portion 20 is configured to substantially assume a shape of a convex dome. A flange portion 25' with an outer diameter larger than that of the large diameter portion 25 is provided on the upper end of the larger diameter portion 25.

For connecting each nozzle portion 3 and tube 8 of the above arrangement, the small diameter portion 26 is inserted inward of a tip end of the tube 8 and connected through a suitable connecting means (e.g. clamping through a clamping tool or adhesion using adhesives). In this connected condition, air X may be supplied from the pump 4 to the nozzles 3.

Figure 5A:
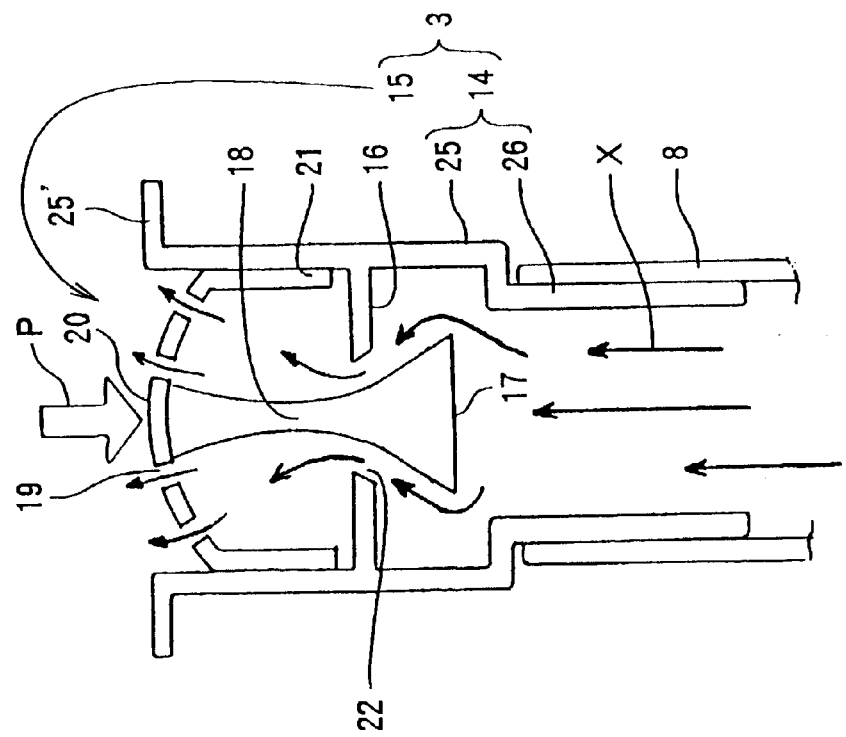
FIG. 5(A) is a longitudinal sectional view schematically showing an arrangement of a main portion according to the above embodiment in which the valve is in a closed condition, and (B) is a longitudinal sectional view schematically showing an arrangement of a main portion according to the above embodiment in which the valve is in an open condition.

FIGS. 5(A) and (B) are longitudinal cross sectional views schematically showing a closed condition and an open condition of one nozzle portion 3 of the above embodiment.

When no downward pressure is applied to the peak portion 20 formed on the top of the nozzle portion 3, the valve body 17 is pushed upward through air pressure X from the upstream side as illustrated in FIG. 5(A), such that the upper surface of the peak portion 20 is accordingly made to project upward from an upper end of the nozzle main body 14 while the valve seat 16 is closed by the valve body 17 to assume a closed condition of the valve. Thus, no discharge of air in the upward direction is performed through the nozzle portion.

Figure 5B:
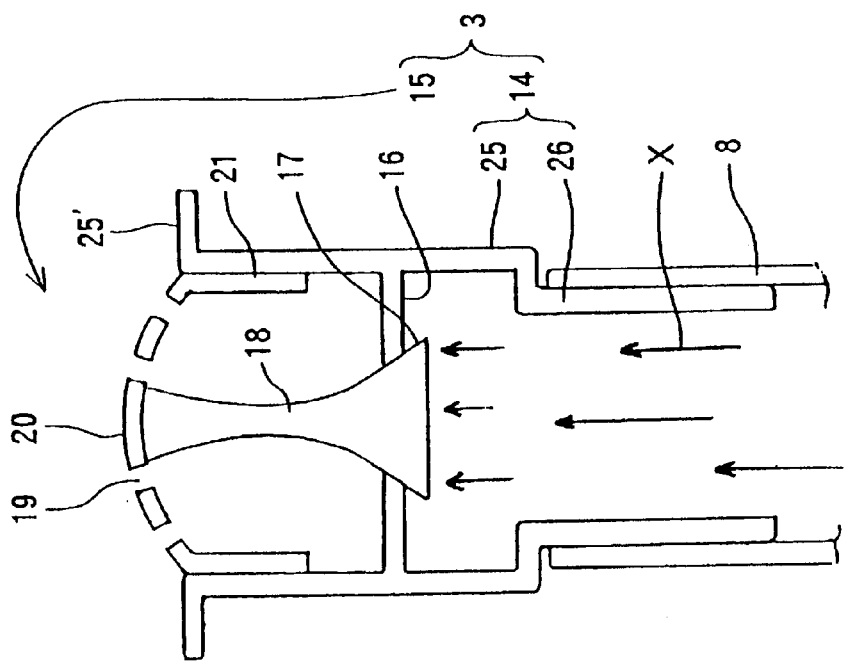

When downward pressure P is applied to the peak portion 20 formed on the top of the nozzle portion 3, the peak portion 20 will be pushed downward through pressure P while the valve body 17, which closed the valve seat 16, is simultaneously pushed downward as illustrated in FIG. 5(B), such that a clearance 22 is formed between the valve seat 16 and the valve body 17 to assume an open condition of the valve. Thus, air X supplied from the pump 4 enters the tubular body 21 through the clearance 22 to pass through the pores 19, 19 . . . of the peak portion 20 and to be discharged upward of the nozzle portion 4.

Referring to the above explanations more strictly, it is not that the valve assumes an open condition when downward pressure P is applied to the peak portion 20 and that the valve assumes a closed condition when no downward pressure P is applied to the peak portion 20, but the valve assumes an open condition when the pressure P is larger than an applied pressure of air X pushing the valve body 17 upward, and the valve assumes a closed condition when this pressure is smaller than pressure P.

Figure 6:
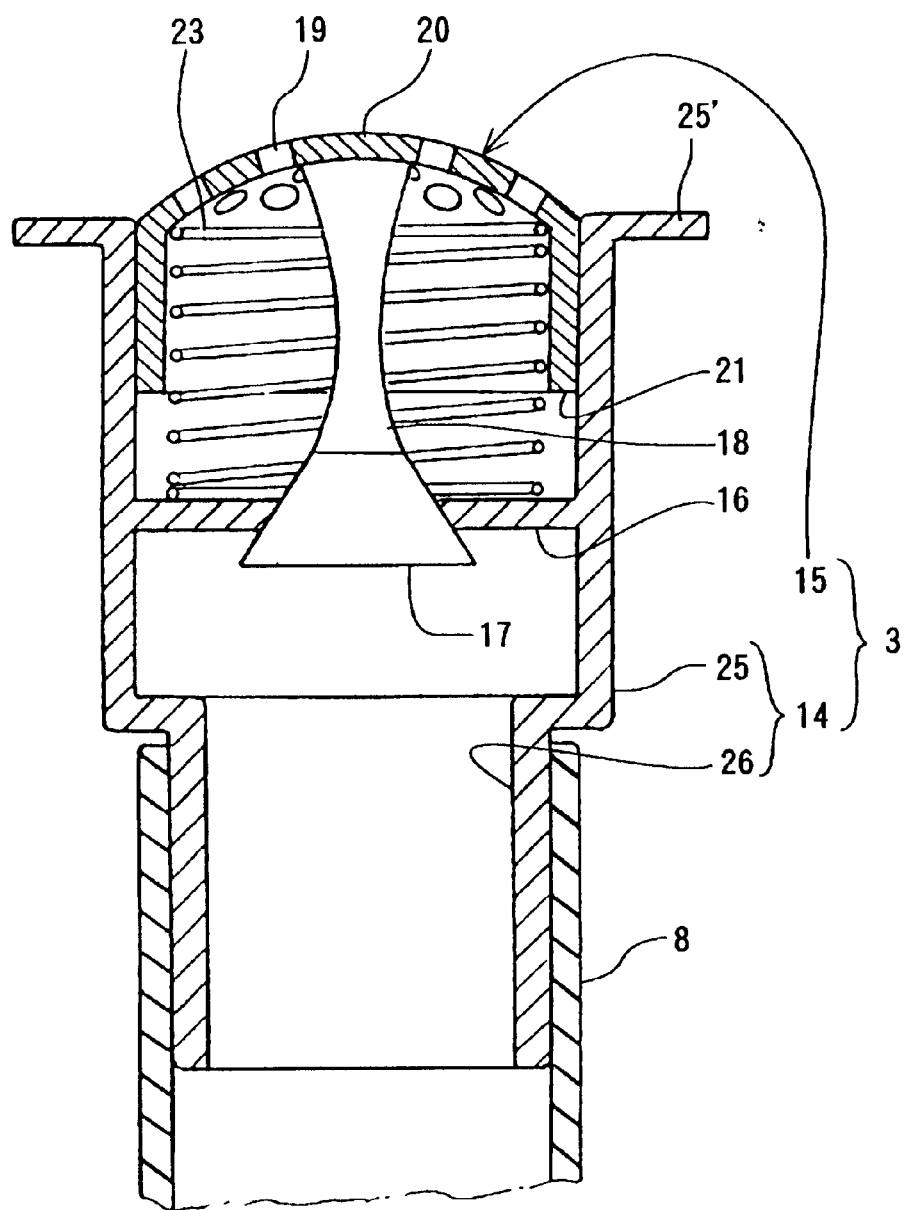
FIG. 6 is a longitudinal sectional view schematically showing a modified example of a main portion according to the above embodiment.

When the applied pressure of air X for pushing the valve body 17 upward is small (for instance, when air X is discharged just by spreading the sheet 13 on the upper surface of the mattress 1), it is possible to provide a spring 23 with suitable elasticity above the valve seat 16 as illustrated in FIG. 6.

Figure 7:
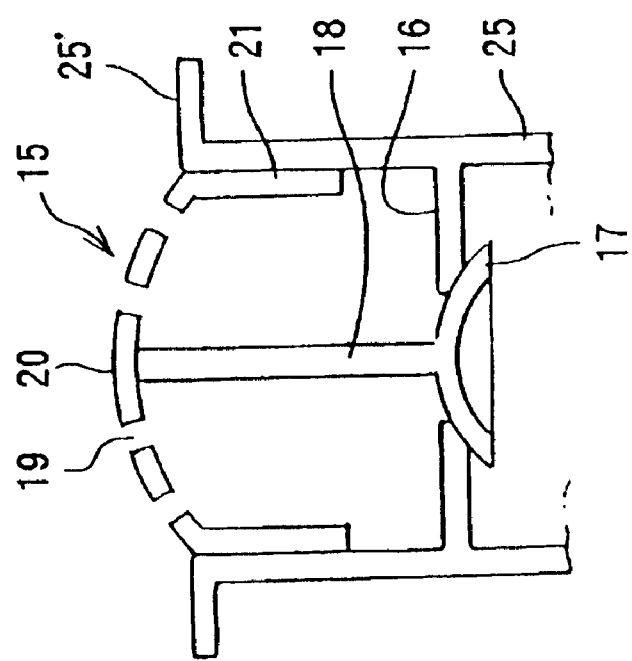
FIG. 7(A) is a longitudinal sectional view schematically showing a modified example of the valve body according to the above embodiment, and (B) is a longitudinal sectional view schematically showing another modified example of the valve body according to the above embodiment.
Figure 7:
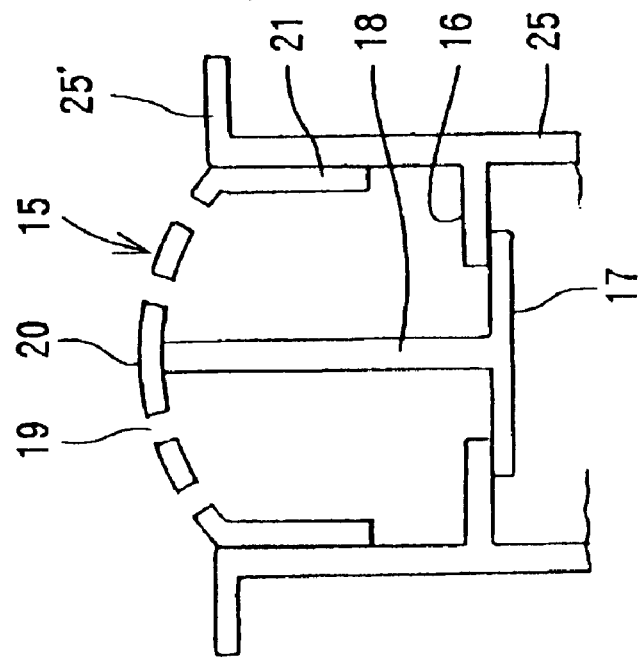

FIG. 7(A) is a longitudinal sectional view schematically showing a modified example of the valve body 17 according to the above embodiment, and FIG. 7(B) is a longitudinal sectional view schematically showing another modified example of the valve body 17 according to the above embodiment.

In FIG. 7(A), the valve body 17 is formed to assume a flat shape and in FIG. 7(B), the valve body 17 is formed to assume a dome-like shape.

Figure 8:
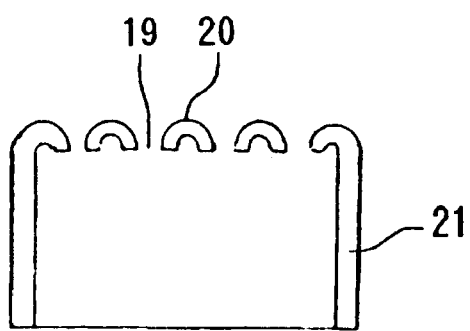
FIGS. 8(A), (B), (C) and (D) are longitudinal sectional views schematically showing modified examples of peak portions 20 according to the above embodiments, respectively.
Figure 8:
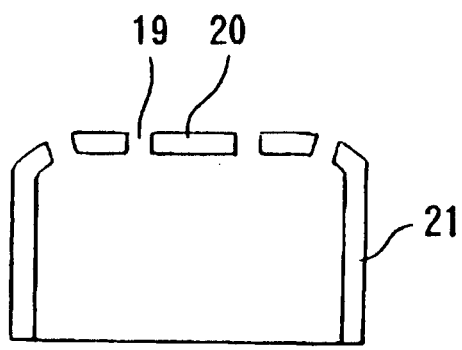
Figure 8:
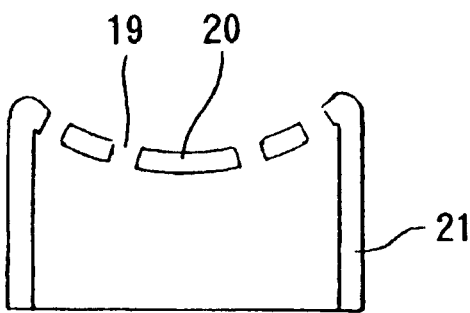
Figure 8:
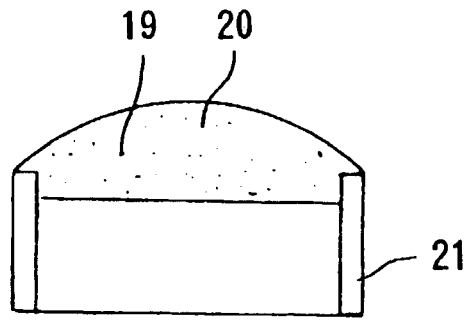

FIGS. 8(A), (B), (C) and (D) are longitudinal sectional views schematically showing modified examples of peak portions 20 according to the above embodiments, respectively.

In FIG. 8(A), the peak portion 20 is formed to assume concave and convex shapes; in FIG. 8(B), the peak portion 20 is formed to assume a flat shape; in FIG. 8(C), the peak portion 20 is formed to assume a concave shape; and in FIG. 8(D), the peak portion 20 is formed of a porous and elastic material (e.g. sponge).

Figure 9:
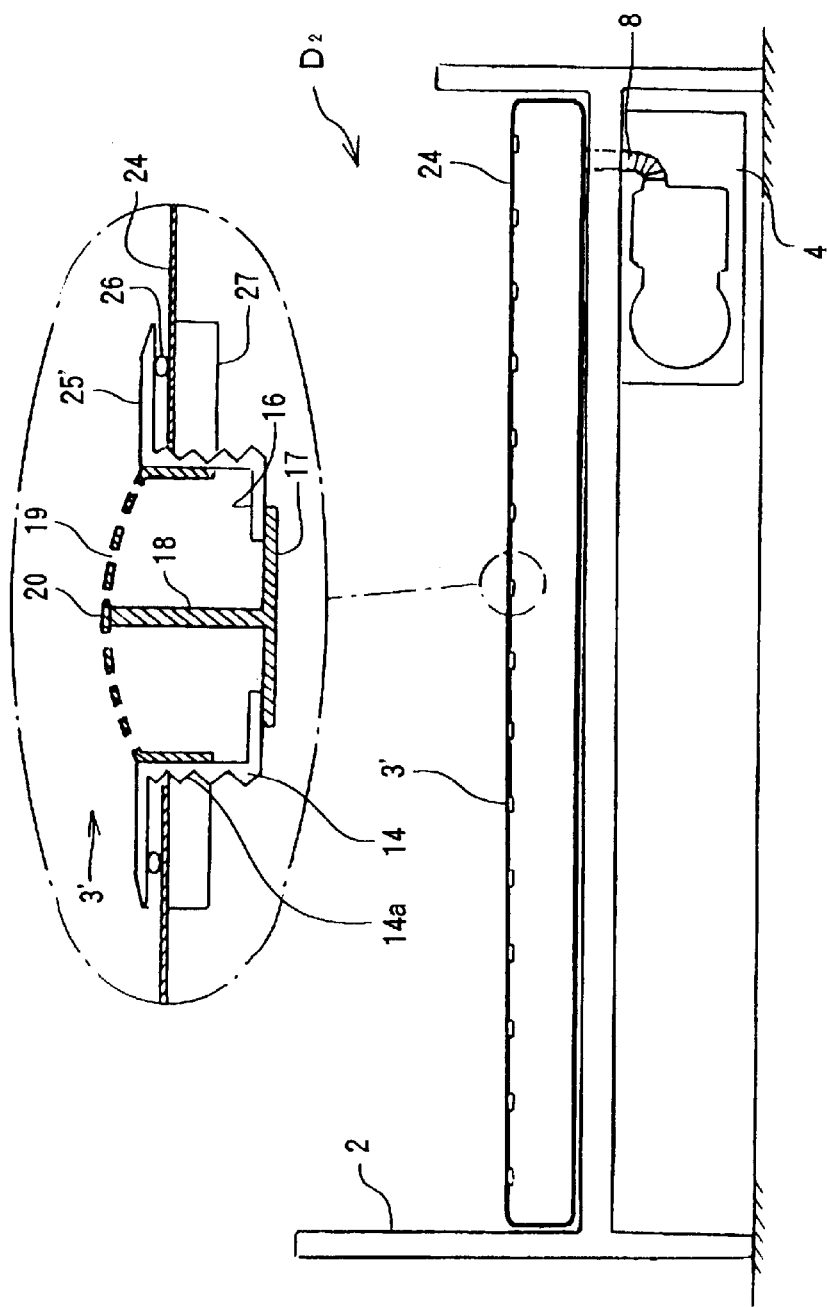
FIG. 9 is a longitudinal sectional view schematically showing an arrangement of the bedsore-preventing mattress according to a second embodiment of the present invention.

FIG. 9 is a longitudinal sectional view schematically showing an arrangement of the bedsore-preventing mattress $D_2$ according to a second embodiment of the present invention. It should be noted that components that are identical to those of the first embodiment are marked with the same reference numerals and explanations thereof will be omitted.

The bedsore-preventing mattress $D_2$ is of a substantially identical arrangement as that of the first embodiment, the difference being the points that an air mattress 24 is used as the mattress 1, that a single tube 8 is employed instead of the plurality of tubes 8a, 8b and 8c wherein the tube 8 connects the pump 4 and the air mattress 24, and that the nozzle portions 3 are replaced by nozzle portions 3'.

These nozzle portions 3' are of substantially identical arrangement as the nozzle portions 3, the only difference being that portions below the valve seat 16 of the nozzle main body 14 have been omitted. A male thread 14a is further formed around an outer periphery of the nozzle main body 14 of each nozzle portion 3', and a packing 26 is provided between an upper side of the upper surface of the air mattress 24 and a lower surface of the flange portion 25'. By screwing a nut member 27 below the nozzle main body 14, the nozzle portion 3' is fastened to the air mattress 24.

It should be noted that the second embodiment may be arranged in that temperature adjustments of air X supplied from the pump 4 are performed through the operating unit 5 or a similar arrangement.

Figure 10:
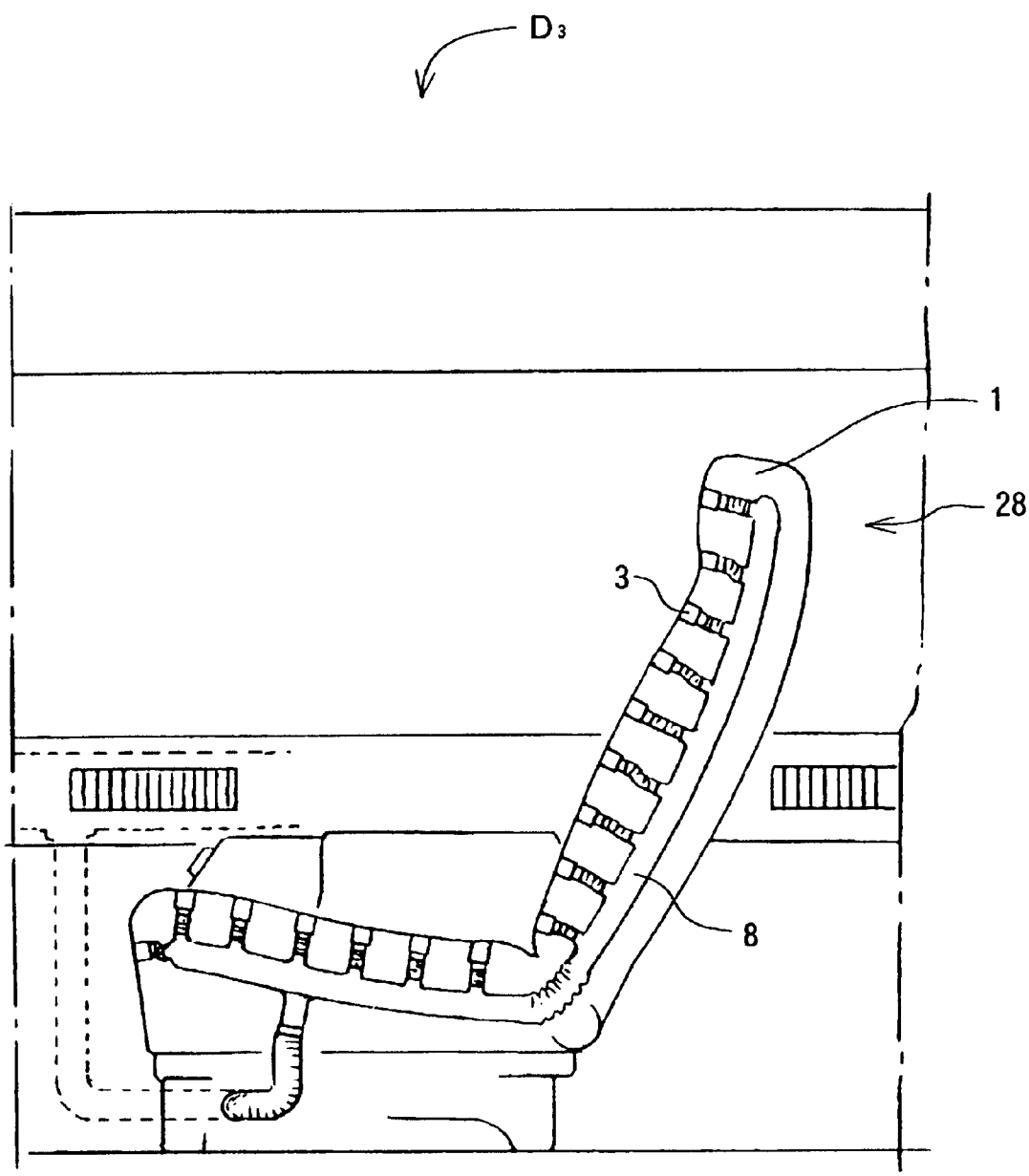
FIG. 10 is a longitudinal sectional view schematically showing an arrangement of the mattress according to a third embodiment of the present invention.

FIG. 10 is a perspective view schematically showing an arrangement of the mattress $D_3$ according to a third embodiment of the present invention.

This mattress $D_3$ is of substantially an identical arrangement as that of the first embodiment, the differences being that the mattress is not used with a bed 2 but as a seat 28 for vehicles such as automobiles, airplanes or trains, and that the mattress 1 is used in a folded manner. Note that an air supply device (not shown) is provided on an upstream side of the tube 8 wherein this air supply device may not only be comprised of a pump but also of another suitable device (for instance, existing air supply devices for air conditioning purposes in case of airplanes).

With the above arrangements, stress (stuffiness, etc.) caused through continuously sitting on the seat 28 for a long time can be eliminated, and users may spend the time during traveling in a convenient manner.

According to the present invention of the above-described arrangement, it is made possible to provide a bedsore-preventing mattress for efficiently eliminating humidity. When this mattress is used as a seat in vehicles such as automobiles, airplanes, or trains, stress (stuffiness, etc.) caused through continuously sitting on the seat for a long time can be eliminated, and users may spend the time during traveling in a convenient manner.

What is claimed is:

1. A mattress used for preventing bedsores, comprising:

a mattress body with a plurality of nozzle members that can be connected to an air supply device are mounted adjacent an upper surface of the mattress body for releasing air, each of the nozzle members includes a substantially cylindrical hollow main body with a valve seat member positioned within the interior of the cylindrical main body and a tube connected to a lower end of the main body to enable connection with the air supply device, and a movable valve assembly mounted within the cylindrical hollow main body having a valve body extending below the valve seat, an upper peak nozzle head with a plurality of pores for passing air, a hollow cylindrical tubular body connected to the nozzle head along a periphery thereof and guided along an inner side of the cylindrical hollow main body and a suspending body interconnecting the upper peak nozzle head and the valve body, wherein a force exerted against the upper peak nozzle head causes the valve body to move downward away from the valve seat to permit air to be discharged upward to be released through the pores.

2. The mattress of claim 1 further including a spring mounted in the tubular body for biasing the valve body to a closed position.

3. The mattress of claim 2, wherein the suspending body has a conic configuration extending through the valve body, wherein a progressively larger aperture is provided through the valve seat as the suspending body is moved downward.

4. The mattress of claim 3 further including means for directing air to be supplied from the air supply device to selected nozzle members.

5. The mattress of claim 4, wherein the control means provides controlled times and temperatures for supplying air.

6. A support member for supporting a user, comprising:

a seat member with a plurality of nozzle members that can be connected to an air supply device are mounted adjacent an upper surface of the seat member for releasing air, each of the nozzle members includes a substantially cylindrical hollow main body with a valve seat member positioned within the interior of the cylindrical main body and a tube connected to a lower end of the main body to enable connection with the air supply device, and a movable valve assembly mounted within the cylindrical hollow main body having a valve body extending below the valve seat, an upper peak nozzle head with a plurality of pores for passing air, a hollow cylindrical tubular body connected to the nozzle head along a periphery thereof and guided along an inner side of the cylindrical hollow main body and a periphery thereof and guided along an inner side of the cylindrical hollow main body and a suspending body interconnecting the upper peak nozzle head and the valve body, wherein a force exerted against the upper peak nozzle head causes the valve body to move downward away from the valve seat to permit air to be discharged upward to be released through the pores.

\* \* \* \* \*